United States Patent
Kim et al.

(10) Patent No.: US 9,727,198 B2
(45) Date of Patent: Aug. 8, 2017

(54) SENSING APPARATUS OF ELECTROMAGNETIC INDUCTION INPUT TYPE AND CONTROL METHOD THEREOF

(71) Applicant: Samsung Electronics Co., Ltd., Gyeonggi-do (KR)

(72) Inventors: Byung-Jik Kim, Gyeonggi-do (KR); Kwang-Choon Kim, Gyeonggi-do (KR)

(73) Assignee: Samsung Electronics Co., Ltd (KR)

(*) Notice: Subject to any disclaimer, the term of this patent is extended or adjusted under 35 U.S.C. 154(b) by 830 days.

(21) Appl. No.: 13/759,610

(22) Filed: Feb. 5, 2013

(65) Prior Publication Data

US 2013/0201152 A1  Aug. 8, 2013

(30) Foreign Application Priority Data

Feb. 8, 2012  (KR) .................. 10-2012-0012720

(51) Int. Cl.
G06F 3/045 (2006.01)
G06F 3/041 (2006.01)
G06F 3/046 (2006.01)

(52) U.S. Cl.
CPC .............. *G06F 3/045* (2013.01); *G06F 3/046* (2013.01); *G06F 3/0418* (2013.01)

(58) Field of Classification Search
CPC ......... G06F 3/045; G06F 3/0418; G06F 3/046
USPC ...... 345/174; 178/18.02, 18.07, 20.01–20.04
See application file for complete search history.

(56) References Cited

U.S. PATENT DOCUMENTS

| | | | | |
|---|---|---|---|---|
| 4,678,869 A | * | 7/1987 | Kable | G06F 3/044 178/18.05 |
| 6,016,140 A | * | 1/2000 | Blouin | G06F 3/0418 178/18.02 |
| 7,176,907 B2 | | 2/2007 | Chao et al. | |
| 8,590,361 B1 | * | 11/2013 | Feller | G01F 1/60 702/87 |
| 2010/0045303 A1 | * | 2/2010 | Williams | G01R 31/008 324/551 |
| 2010/0206644 A1 | * | 8/2010 | Yeh | G06F 3/03545 178/18.07 |

* cited by examiner

*Primary Examiner* — Kent Chang
*Assistant Examiner* — Mark Edwards
(74) *Attorney, Agent, or Firm* — The Farrell Law Firm, P.C.

(57) ABSTRACT

Methods and apparatus are provided for determining an input position of a touch object. An input signal is received from the touch object, and one or more sensing signals are output. A resistance of each of one or more sub-loops is measured, and a resistance information lookup table is generated with each resistance value of a corresponding sub-loop of the one or more sub-loops. The one or more sensing signals are corrected based on the resistance information lookup table. The input position of the touch object is determined based on the corrected one or more sensing signals.

18 Claims, 7 Drawing Sheets

SENSING APPARATUS OF ELECTROMAGNETIC INDUCTION INPUT TYPE AND CONTROL METHOD THEREOF

PRIORITY

This application claims priority under 35 U.S.C. §119(a) to Korean Patent Application Serial No. 10-2012-0012720, which was filed in the Korean Intellectual Property Office on Feb. 8, 2012, the contents of which are incorporated herein by reference.

BACKGROUND OF THE INVENTION

1. Field of the Invention

The present invention relates generally to an electromagnetic induction input type sensing apparatus and a control method thereof, and more particularly, to a sensing apparatus for performing a correction process on an input sensing signal, and a control method thereof.

2. Description of the Related Art

In order to input a particular instruction to a smart phone or a touch screen, a user can designate a particular icon for that instruction, which responds to a touch object such as a part of the user's body or an Electromagnetic Induction (EI) pen, at a particular position of a display.

A scheme in which a part of the user's body touches the surface of a touch screen may be implemented by using a capacitive type touch screen. A capacitive type touch screen includes transparent electrodes and a capacitive element between the transparent electrodes. The user touches the surface of the touch screen using the part of the user's body, and the touch of the part of the user's body is sensed based on a capacitance of the capacitive element, which changes according to the touch on the surface of the touch screen.

The capacitive type touch screen is problematic in that a relatively large touch area makes it difficult to perform precise input. In contrast, an EI type touch screen is advantageous in that it can operate in a small touch area.

In the EI type touch screen, a loop coil is disposed on a circuit board, and a control operation is performed to apply a voltage to the loop coil and generate an electromagnetic field. A control operation is performed so that the generated electromagnetic field may be delivered to an EI pen. The EI pen may include a capacitor and a loop, and can again emit the electromagnetic field having a predetermined frequency component.

The electromagnetic field emitted by the EI pen can again be delivered to the loop coil of the circuit board. Accordingly, a determination can be made as to which position the EI pen is close to on the surface of the touch screen.

Also, the configuration of sensing a pen pressure of the EI pen allows a sensing apparatus to use the phase of an input signal.

A conventional sensing apparatus includes multiple loop coils on the circuit board. Resistances or impedances of the multiple loop coils are required to be identical. When resistances or impedances are identical the multiple loop coils can have output signals with an identical value in response to sensing signals with an identical magnitude. Thus, it is possible to determine an accurate input point of the EI pen.

However, due to an actual technological limit of a manufacturing process, resistances or impedances of all loop coils are forced to be different. Accordingly, magnitudes of output signals from loop coils are forced to be different in response to sensing signals with an identical magnitude. Therefore, a difference between magnitudes of output signals from the loop coils causes errors in both detection of an accurate input point of the EI pen and measurement of a pen pressure.

SUMMARY OF THE INVENTION

The present invention has been made to address at least the above problems and/or disadvantages and to provide at least the advantages described below. Accordingly, an aspect of the present invention provides a sensing apparatus for correcting an error caused by a difference in resistance between loop coils, and a control method thereof.

In accordance with an aspect of the present invention, a sensing apparatus of an electromagnetic induction input type is provided, which determines an input position of a touch object. The sensing apparatus includes a loop unit, having one or more sub-loops, which receives an input signal from the touch object and outputs one or more sensing signals. The sensing apparatus also includes a resistance information measurement unit for measuring a resistance of each of the one or more sub-loops, and generating a resistance information lookup table with each resistance value of a corresponding sub-loop of the one or more sub-loops. The sensing apparatus further includes a controller for correcting the one or more sensing signals based on the resistance information lookup table, and determining the input position of the touch object based on the corrected one or more sensing signals.

In accordance with another aspect of the present invention, a control method of a sensing apparatus of an electromagnetic induction input type is provided, which determines an input position of a touch object and includes one or more sub-loops. An input signal is received from the touch object, and one or more sensing signals are output. A resistance of each of the one or more sub-loops is measured, and a resistance information lookup table is generated with each resistance value of a corresponding sub-loop of the one or more sub-loops. The one or more sensing signals are corrected based on the resistance information lookup table. The input position of the touch object is determined based on the corrected one or more sensing signals.

In accordance with another aspect of the present invention, a sensing apparatus of an electromagnetic induction input type is provided, which determines an input position of a touch object. The sensing apparatus includes a loop unit, having one or more sub-loops, which receives an input signal from the touch object and outputs one or more sensing signals. The sensing apparatus also includes a storage unit for storing a resistance information lookup table with a respective resistance matched to each of the one or more sub-loops. The sensing apparatus further includes a controller for correcting the one or more sensing signals based on the resistance information lookup table, and determining the input position of the touch object based on the corrected one or more sensing signals.

In accordance with an additional aspect of the present invention, a control method of a sensing apparatus of an electromagnetic induction input type is provided, which determines an input position of a touch object. An input signal is received from the touch object, and one or more sensing signals are output from one or more sub-loops. A previously-stored resistance information lookup table with a respective resistance matched to each of the one or more sub-loops is read. The one or more sensing signals are corrected based on the resistance information lookup table, and the input position of the touch object is determined based on the corrected one or more sensing signals.

In accordance with a further aspect of the present invention, an apparatus for measuring resistance information on a sensing apparatus of an electromagnetic induction input type is provided, which includes one or more sub-loops. The apparatus includes a sensing resistance unit connected to an end of the one or more sub-loops. The apparatus also includes a sensor unit for sensing a value of a voltage applied to the sensing resistance unit and a value of a current flowing through the sensing resistance unit. The apparatus further includes a storage unit for storing a resistance information lookup table with a respective resistance matched to each of the one or more sub-loops, which has been generated based on the value of the voltage applied to the sensing resistance unit and the value of the current flowing through the sensing resistance unit.

In accordance with another aspect of the present invention, a control method of an apparatus is provided which includes a sensing resistance unit and measures resistance information on a sensing apparatus of an electromagnetic induction input type, which includes one or more sub-loops. A value of a voltage applied to the sensing resistance unit and a value of a current flowing through the sensing resistance unit are sensed. A resistance information lookup table is stored with a respective resistance matched to each of the one or more sub-loops, which has been generated based on the value of the voltage applied to the sensing resistance unit and the value of the current flowing through the sensing resistance unit.

BRIEF DESCRIPTION OF THE DRAWINGS

The above and other features, aspects, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
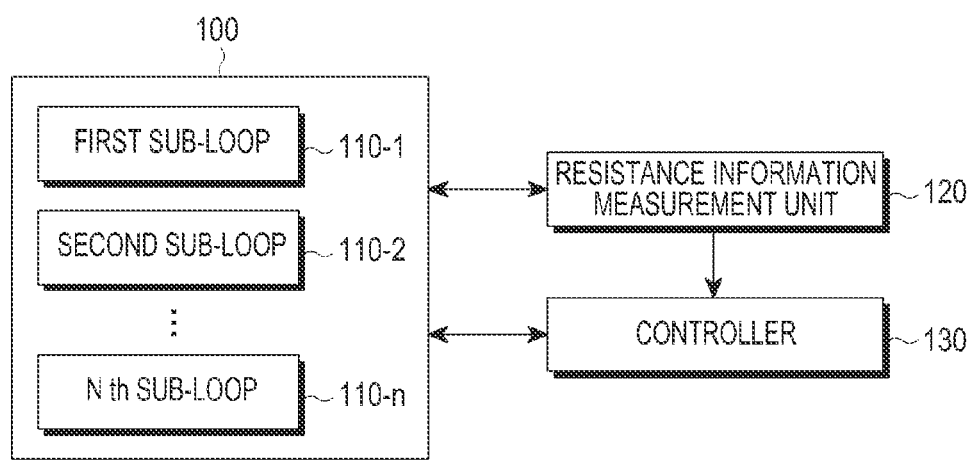
FIG. 1 is a block diagram illustrating a configuration of a sensing apparatus, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

FIG. 1 is a block diagram illustrating a configuration of a sensing apparatus, according to an embodiment of the present invention.

Referring to FIG. 1, a sensing apparatus includes a loop unit 100, a resistance information measurement unit 120, and a controller 130. The loop unit 100 includes a first sub-loop 110-1, a second sub-loop 110-2, and an $n^{th}$ sub-loop 110-$n$. Herein, n is any natural number, and the loop unit 100 includes multiple sub-loops.

The loop unit 100 includes the multiple sub-loops 110-1, 110-2 and 110-$n$. Each of the multiple sub-loops 110-1, 110-2 and 110-$n$ may receive, as input, a reception signal that is input from the outside. A reception signal may be generated by a touch object. The touch object may be a means for outputting a predetermined electromagnetic field, and for example, may be implemented by an EI pen, a manual EI pen, or the like.

An EI pen existing around the sub-loops 110-1, 110-2 and 110-$n$ may first receive an induced electromagnetic field from the sub-loops 110-1, 110-2 and 110-$n$, and then may emit the electromagnetic field. The EI pen may be used in one embodiment of the present invention, and there is no limit when the EI pen is a means that may first receive an electromagnetic field delivered to it and then may emit an electromagnetic field. Each of the sub-loops 110-1, 110-2 and 110-$n$ not only may sense a reception signal, but also may output a predetermined transmission signal. The transmission signal may first be input to the EI pen, and may then be output from the EI pen.

Each of the sub-loops 110-1, 110-2 and 110-$n$ may output a sensing signal based on an electromagnetic induction phenomenon caused by an input reception signal. A sensing signal that is output from a sub-loop disposed relatively near the touch object, may have a larger magnitude than that of a sensing signal that is output from a sub-loop disposed relatively away from the touch object. This relation is due to the fact that the magnitude of an electromagnetic field that is output from the touch object is inversely proportional to the square of a distance from the touch object.

Each of the sub-loops 110-1, 110-2 and 110-$n$ may be implemented by a loop coil having a predetermined area. The sub-loops 110-1, 110-2 and 110-$n$ may be disposed so as to overlap each other, or may be disposed so as to be spaced a predetermined distance from each other. Some of the sub-loops are disposed so as to overlap each other, and some of the remaining sub-loops may be disposed so as not to overlap each other. Also, sub-loop groups may be spaced a predetermined distance from each other. The above description of the sub-loops 110-1, 110-2 and 110-$n$ is made for illustrative purposes only, and those skilled in the art will easily understand that there is no limit when the sub-loops 110-1, 110-2 and 110-$n$ correspond to a means capable of measuring an input signal, which is input from the touch object.

In response to a reception signal from a touch object, the sub-loops 110-1, 110-2 and 110-$n$ output sensing signals having different magnitudes, and the controller 130 may determine an input point of the touch object based on the sensing signals having different magnitudes. The controller 130 may determine a pen pressure of the touch object based on phase information of a sensing signal, which is input from each of the sub-loops 110-1, 110-2 and 110-$n$.

As described above, resistances or impedances of the sub-loops 110-1, 110-2 and 110-$n$ may be different. The resistance information measurement unit 120 may measure a resistance of each of the sub-loops 110-1, 110-2 and 110-$n$. The resistance information measurement unit 120 may output resistance information of each of the sub-loops 110-1, 110-2 and 110-n to the controller 130. The resistance information measurement unit 120 may also output the measured resistance information to a storage unit. In this case, the controller 130 may also read resistance information from the storage unit. A configuration in which the resistance information measurement unit 120 measures a resistance of each of the sub-loops 110-1, 110-2 and 110-n, is described in greater detail below.

The controller 130 may correct a sensing signal from each of the sub-loops 110-1, 110-2 and 110-n by using resistance information. The controller 130 may perform a correction process on each sensing signal, as if the sub-loops 110-1, 110-2 and 110-n all had an identical resistance. For example, the resistance information measurement unit 120 may generate a resistance information lookup table as shown in Table 1 below.

TABLE 1

| Sub-loops   | 1  | 2  | 3  | 4  | 5  | 6  | 7  | 8  | 9  |
|-------------|----|----|----|----|----|----|----|----|----|
| Resistances | 30 | 30 | 28 | 30 | 32 | 30 | 30 | 32 | 28 |

The controller 130 may receive, as input, resistance information, as shown in Table 1, and a sensing signal, as shown in Table 2 below.

TABLE 2

| Sub-loops       | 1 | 2 | 3 | 4 | 5 | 6  | 7 | 8 | 9 |
|-----------------|---|---|---|---|---|----|---|---|---|
| Sensing signals | 0 | 0 | 3 | 5 | 8 | 12 | 9 | 6 | 4 |

The controller 130 may determine a weight of each of the sub-loops based on the resistance information, as shown in Table 1. A process for determining a weight is expressed by Equation (1) below.

$$\alpha = \frac{R_i}{R_{med}} \quad (1)$$

In Equation (1), $\alpha$ is a weight, $R_i$ is a resistance value of an $i^{th}$ sub-loop, and $R_{med}$ signifies the average of resistance values of all sub-loops.

The average of resistance values of all sub-loops in Table 1 is 30, and a weight of a third sub-loop is 0.93. The controller 130 may determine weights of all the sub-loops, and may generate a weight lookup table, as shown in Table 3 below, for the sub-loops shown in Table 1.

TABLE 3

| Sub-loops | 1 | 2 | 3    | 4 | 5    | 6 | 7 | 8    | 9    |
|-----------|---|---|------|---|------|---|---|------|------|
| Weights   | 1 | 1 | 0.93 | 1 | 1.06 | 1 | 1 | 1.06 | 0.93 |

The controller 130 may correct a sensing signal based on the weight lookup table. The controller 130 may multiply each sensing signal by a weight, and may determine a corrected sensing signal value. For example, the controller 130 may correct each sensing signal, as shown in Table 2, and may generate information on each corrected sensing signal having a magnitude, as shown in Table 4 below.

TABLE 4

| Sub-loops       | 1 | 2 | 3    | 4 | 5    | 6  | 7 | 8   | 9    |
|-----------------|---|---|------|---|------|----|---|-----|------|
| Sensing signals | 0 | 0 | 2.79 | 5 | 8.48 | 12 | 9 | 6.4 | 3.72 |

The controller 130 may correct a sensing signal from each sub-loop, as shown in Table 4, and may reduce an error caused by a difference between the resistances of the sub-loops by using corrected magnitudes of sensing signals, as shown in Table 4.

The controller 130 may determine a peak point from the corrected sensing signals, and may determine an input point of the touch object. A configuration in which the controller 130 determines an input point of the touch object by using the corrected sensing signals has no limit. The controller 130 may be implemented by a Central Processing Unit (CPU), a microprocessor, an Integrated Circuit (IC) chip, a minicomputer, or the like. The controller 130 may be implemented in hardware as one unit together with a CPU of the sensing apparatus, or may be implemented in hardware separate from the CPU of the sensing apparatus.

The configuration as described above may reduce the error caused by differences in the resistances of the sub-loops 110-1, 110-2 and 110-n.

Figure 2:
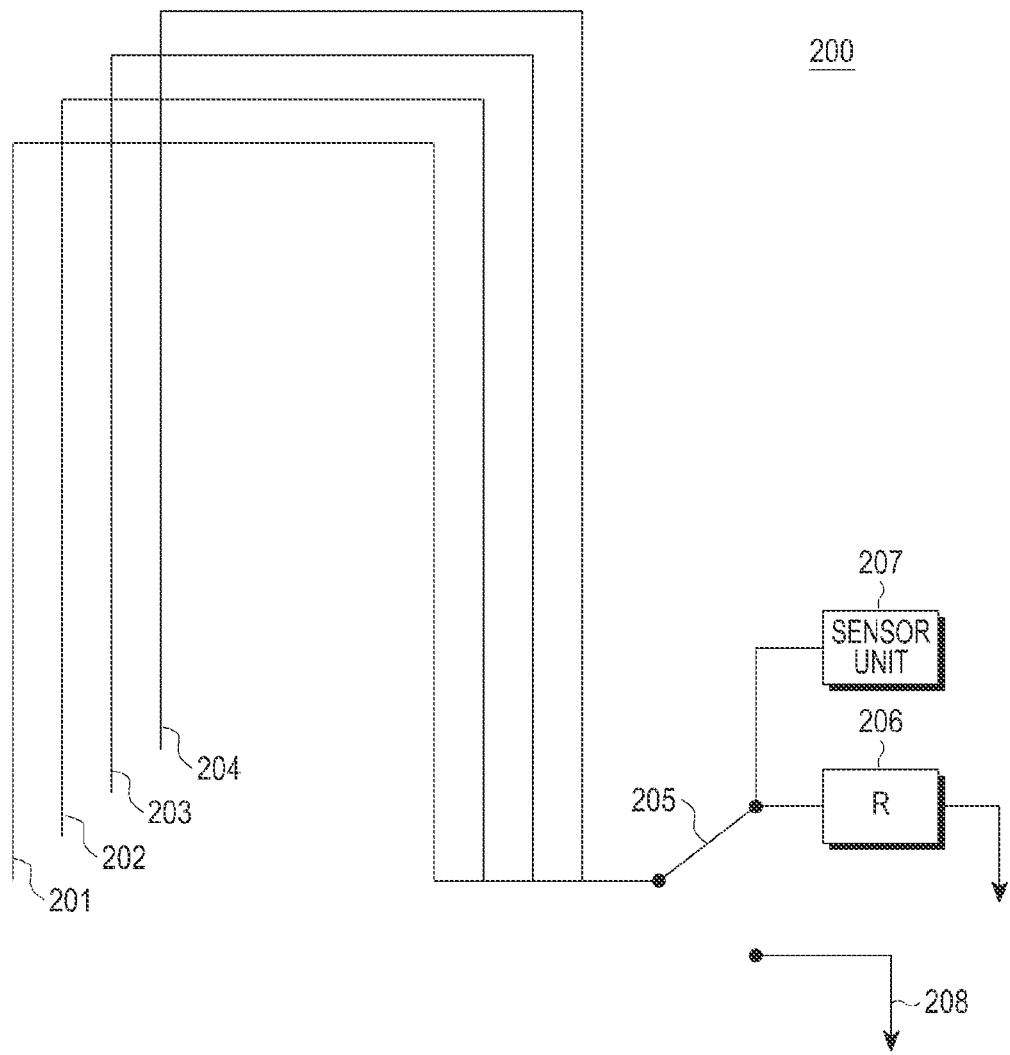
FIG. 2 is a conceptual diagram illustrating a sensing apparatus, according to an embodiment of the present invention.

FIG. 2 is a conceptual diagram illustrating a sensing apparatus, according to an embodiment of the present invention.

Referring to FIG. 2, a sensing apparatus includes a first sub-loop 201, a second sub-loop 202, a third sub-loop 203, a fourth sub-loop 204, a switching unit 205, a sensing resistance unit 206, a sensor unit 207, and a common unit 208. The elements may be disposed on one board 200. The sensing resistance unit 206 and the sensor unit 207 may be commonly called a "resistance information measurement unit."

Each of the first sub-loop 201, the second sub-loop 202, the third sub-loop 203, and the fourth sub-loop 204 may receive, as input, a reception signal from a touch object. Also, each of the first sub-loop 201, the second sub-loop 202, the third sub-loop 203 and the fourth sub-loop 204 may output a sensing signal based on an electromagnetic induction phenomenon.

The first sub-loop 201, the second sub-loop 202, the third sub-loop 203 and the fourth sub-loop 204 may be connected to the common unit 208 in a mode for measuring a position of the touch object. In this case, the switching unit 205 may be connected to the common unit 208 in a manner that differs from that shown in FIG. 2. A sensing signal that is input to the common unit 208, may be output to a controller, and the controller analyzes the sensing signal and determines an input position of the touch object.

In a mode for measuring resistance information, the first sub-loop 201, the second sub-loop 202, the third sub-loop 203 and the fourth sub-loop 204 may be connected to the sensing resistance unit 206 and the sensor unit 207. Specifically, the switching unit 205 may be connected as shown in FIG. 2. In the mode for measuring resistance information, a preset voltage V may be applied, in order, to the first sub-loop 201, the second sub-loop 202, the third sub-loop 203 and the fourth sub-loop 204.

The sensor unit 207 may sense, for example, the magnitude of a current I flowing through the sensing resistance unit 206 and the magnitude of a voltage applied to the sensing resistance unit 206.

The sensor unit 207 may measure a resistance value of each of the first sub-loop 201, the second sub-loop 202, the third sub-loop 203 and the fourth sub-loop 204, based on the value of a voltage V applied to each loop, the value of the voltage applied to the sensing resistance unit 206 and the value of the current I flowing through the sensing resistance unit 206. The sensor unit 207 may generate a resistance information lookup table of the first sub-loop 201, the second sub-loop 202, the third sub-loop 203 and the fourth sub-loop 204. Otherwise, the sensor unit 207 may simply output the value of the measured voltage $V_R$ and the value of the measured current I value to the controller, and the controller may generate a resistance information lookup table.

A process in which the sensor unit 207 calculates a resistance value, may be expressed, for example, by Equation (2) below.

$$R = \frac{V - V_R}{I} \quad (2)$$

The sensor unit 207 may measure resistances of the first sub-loop 201, the second sub-loop 202, the third sub-loop 203, and the fourth sub-loop 204, in order. Accordingly, a resistance information lookup table may be generated.

Meanwhile, as described above, the sensing apparatus may be disposed on the one board 200, and may be implemented in hardware separate from the controller.

Figure 3:
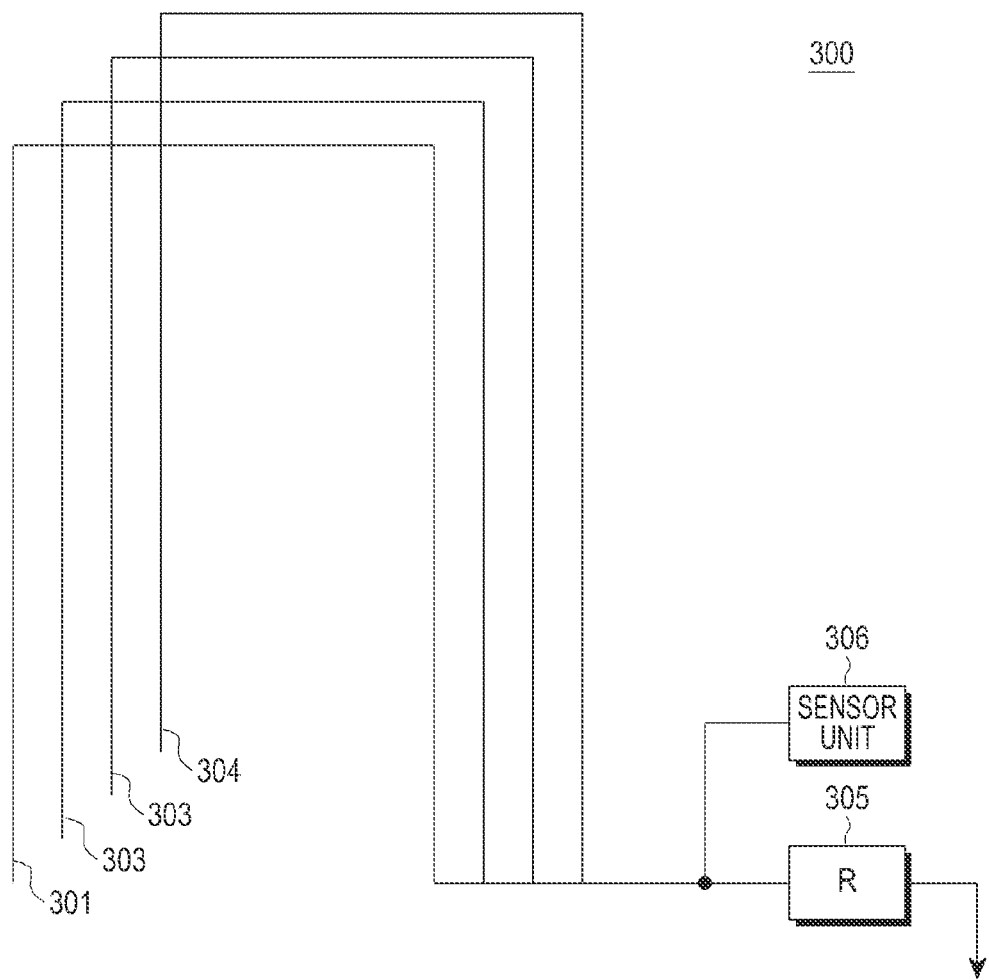
FIG. 3 is a conceptual diagram illustrating a sensing apparatus, according to another embodiment of the present invention.

FIG. 3 is a conceptual diagram illustrating a sensing apparatus, according to another embodiment of the present invention.

Referring to FIG. 3, a sensing apparatus includes a first sub-loop 301, a second sub-loop 302, a third sub-loop 303, a fourth sub-loop 304, a resistance unit 305, and a sensor unit 306. The elements as described above may be disposed on one board 300. The sensing apparatus as shown in FIG. 3 does not include a switching unit, in contrast to the sensing apparatus as shown in FIG. 2. The sensing apparatus, as shown in FIG. 3, is a structure in which the resistance unit 305 is connected to the end of each of the first sub-loop 301, the second sub-loop 302, the third sub-loop 303 and the fourth sub-loop 304.

Specifically, the sensing apparatus, as shown in FIG. 3, corresponds to a case in which the resistance unit 305 is connected to the first sub-loop 301, the second sub-loop 302, the third sub-loop 303 and the fourth sub-loop 304, even in a mode for measuring a position of the touch object. The resistance unit 305 may be adopted for the generation of a potential difference or for a current drop.

In a mode for measuring a resistance, the sensor unit 306 may sense the value of a voltage $V_R$ applied to the resistance unit 305 and the value of a current I flowing through the resistance unit 305.

The sensor unit 306 may measure a resistance of each of the first sub-loop 301, the second sub-loop 302, the third sub-loop 303 and the fourth sub-loop 304, based on the value of the measured voltage $V_R$, the value of the measured current I, and the value of a voltage V applied to each of the first sub-loop 301, the second sub-loop 302, the third sub-loop 303 and the fourth sub-loop 304. The sensor unit 306 may measure a resistance by using Equation (2). Otherwise, the sensor unit 306 may output the sensed values to a controller, and the controller may measure a resistance of each of the first sub-loop 301, the second sub-loop 302, the third sub-loop 303 and the fourth sub-loop 304.

The process as described above may also be performed, in order, on the first sub-loop 301, the second sub-loop 302, the third sub-loop 303 and the fourth sub-loop 304. The sensing apparatus may identify whether resistance information of each of the sub-loops has been measured. When the resistance information of each of the sub-loops has been measured, the mode for measuring resistance information may be completed.

The sensing apparatuses of FIG. 1, FIG. 2 and FIG. 3, as described above, are related to embodiments in which the sensing apparatus includes the resistance information measurement unit. However, a sensing apparatus may have a configuration in which it does not include the resistance information measurement unit in contrast to the above embodiments, and a sensing signal is corrected by using a previously-stored resistance information lookup table. Such a sensing apparatus is described in greater detail below with reference to FIG. 4.

Figure 4:
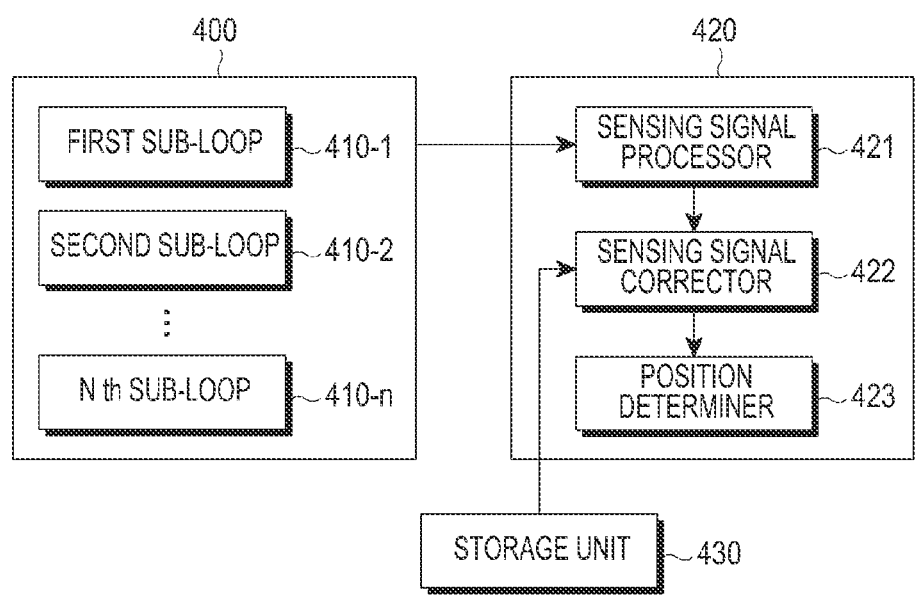
FIG. 4 is a block diagram illustrating a configuration of a sensing apparatus, according to an embodiment of the present invention.

FIG. 4 is a block diagram illustrating a configuration of a sensing apparatus according to an embodiment of the present invention.

Referring to FIG. 4, a sensing apparatus includes a loop unit 400, a controller 420, and a storage unit 430. The loop unit 400 includes a first sub-loop 410-1, a second sub-loop 410-2, and an $n^{th}$ sub-loop 410-n. The controller 420 includes a sensing signal processor 421, a sensing signal corrector 422, and a position determiner 423.

Each of the multiple sub-loops 410-1, 410-2 and 410-n may receive, as input, a reception signal, which is input from the outside. Each of the sub-loops 410-1, 410-2 and 410-n may output a sensing signal based on an electromagnetic induction phenomenon.

Each of the sub-loops 410-1, 410-2 and 410-n may output a sensing signal to the sensing signal processor 421. The sensing signal processor 421 may process an input sensing signal. For example, the sensing signal processor 421 may include an Analog-to-Digital Conversion (ADC) means, and may convert an input sensing signal having an analog form into a digital signal. The sensing signal processor 421 may filter the sensing signal, and may remove noise from the sensing signal. Further, the sensing signal processor 421 may include an amplification means, and may amplify the sensing signal by a predetermined gain.

The sensing signal corrector 422 may correct a processed sensing signal. The sensing signal corrector 422 may read a previously-stored resistance information lookup table from the storage unit 430. The resistance information lookup table may include information on resistances of the sub-loops 410-1, 410-2 and 410-n. The resistance information lookup table may be, for example, Table 1.

The sensing signal corrector 422 may correct a sensing signal from each of the sub-loops 410-1, 410-2 and 410-n based on the read lookup table. The sensing signal corrector 422, for example, may generate the weight lookup table, as shown in Table 3, based on the resistance information lookup table. The sensing signal corrector 422 may multiply the corresponding sensing signal value by a weight, and may correct the corresponding sensing signal.

The sensing signal corrector 422 may output the corrected sensing signals to the position determiner 423. The position determiner 423 may determine an input position of the touch object based on the sensing signals.

In another embodiment of the present invention, a pen pressure measurement unit may be adopted instead of the position determiner 423, and the pen pressure measurement unit may measure an input pen pressure of the touch object.

As described above, the sensing apparatus, according to an embodiment of the present invention does not include a means for measuring resistance information, and may correct a sensing signal by using a lookup table of previously-measured resistance information, which has been stored in the sensing apparatus.

Figure 5:
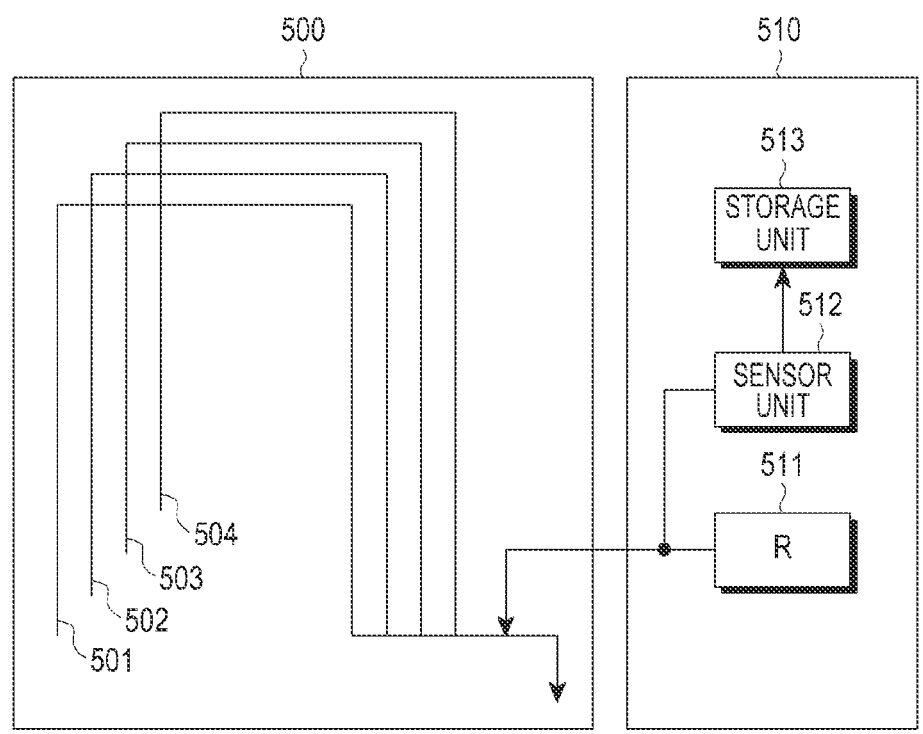
FIG. 5 is a conceptual diagram illustrating an apparatus for measuring resistance information, according to an embodiment of the present invention.

FIG. 5 is a conceptual diagram illustrating an apparatus for measuring resistance information, according to an embodiment of the present invention.

Referring to FIG. 5, an apparatus 510 for measuring resistance information is connected to a loop unit 500, and may measure a resistance of each of sub-loops 501, 502, 503 and 504 of the loop unit 500.

The apparatus 510 for measuring resistance information may apply a predetermined voltage V to each of the sub-loops 501, 502, 503 and 504 in order. Specifically, a sub-loop to which a test signal is applied among the sub-loops 501, 502, 503 and 504, will be referred to as a "sub-loop to be tested."

The apparatus 510 for measuring resistance information includes a sensing resistance unit 511 and a sensor unit 512. The sensor unit 512 may sense the value of a voltage $V_R$ applied to the sensing resistance unit 511 and the value of a current I flowing through the sensing resistance unit 511.

The apparatus 510 for measuring resistance information may designate each of the sub-loops 501, 502, 503 and 504, as a sub-loop to be tested, in order, and may measure a resistance value of each sub-loop to be tested. The apparatus 510 for measuring resistance information, for example, may measure a resistance of each of the sub-loops 501, 502, 503 and 504 by using Equation (2).

The apparatus 510 for measuring resistance information may store the measured resistances of the sub-loops 501, 502, 503 and 504 in a storage unit 513, and may generate a resistance information lookup table.

The apparatus 510 for measuring resistance information, for example, may measure resistance information of the loop unit 500 during a process for producing a sensing apparatus. Also, the apparatus 510 for measuring resistance information may provide the resistance information lookup table to the sensing apparatus, as shown in FIG. 4.

According to the embodiments of the present invention shown in FIG. 4 and FIG. 5, the sensing apparatus may not include the means for measuring resistance information, and may correct a sensing signal.

Figure 6:
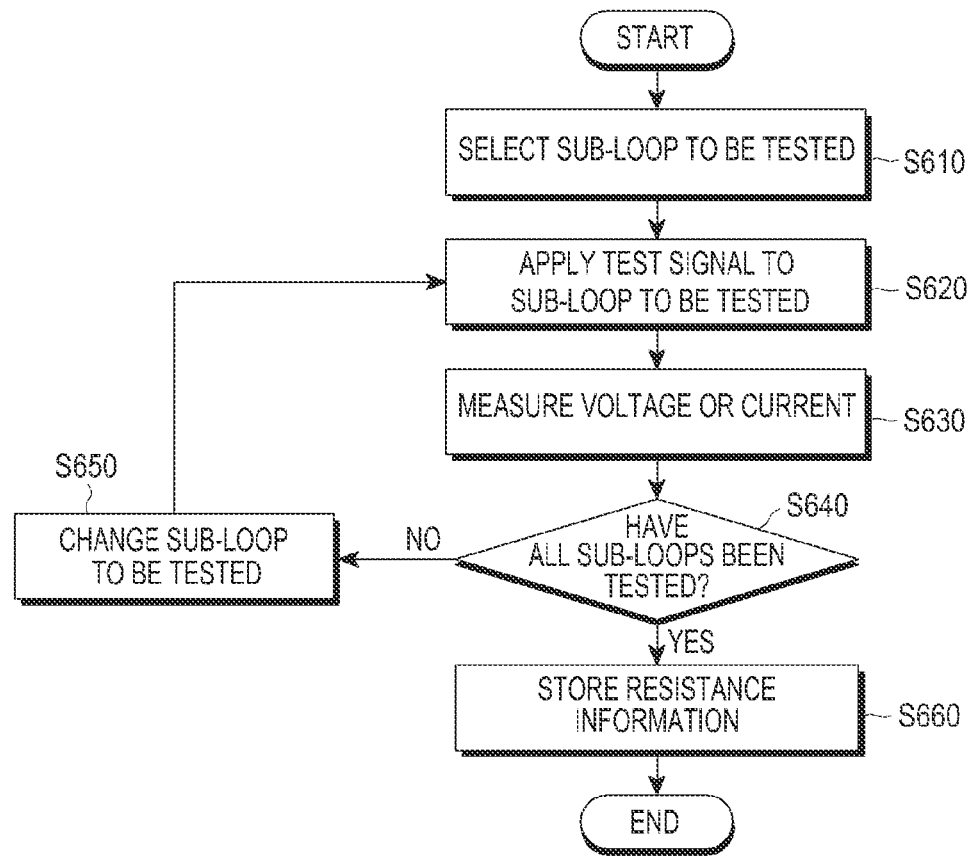
FIG. 6 is a flowchart illustrating a method for generating a resistance information lookup table, according to an embodiment of the present invention.

FIG. 6 is a flowchart illustrating a method for generating a resistance information lookup table, according to an embodiment of the present invention.

The sensing apparatus selects a sub-loop to be tested from among multiple sub-loops, in step S610. The sensing apparatus applies a test signal to the selected sub-loop to be tested, in step S620. The sensing apparatus may apply, for example, a predetermined voltage V to the sub-loop to be tested.

The sensing apparatus measures a voltage $V_R$ applied to the sensing resistance unit and a current I flowing through the sensing resistance unit, in step S630, and repeatedly performs this process for each of the sub-loops. Specifically, the sensing apparatus determines whether all the sub-loops have been tested, in step S640. When all the sub-loops have not been tested, the sensing apparatus changes a sub-loop to be tested, in step S650, and returns to step S620.

When all the sub-loops have been tested, the sensing apparatus stores resistance information, in step S660.

Figure 7:
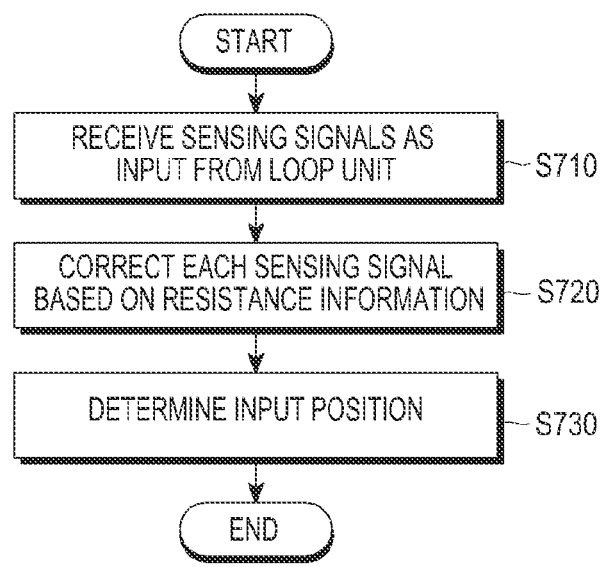
FIG. 7 is a flowchart illustrating a method for determining an input position of a touch object, according to an embodiment of the present invention.

FIG. 7 is a flowchart illustrating a method for determining an input position of a touch object, according to an embodiment of the present invention.

As shown in FIG. 7, the sensing apparatus receives, as input, sensing signals from the loop unit, in step S710. The sensing apparatus corrects each sensing signal based on resistance information, in step S720. The sensing apparatus may directly generate a resistance information lookup table, or may have previously stored a resistance information lookup table.

The sensing apparatus determines an input position of the touch object based on the corrected sensing signals, in step S730. Meanwhile, as described above, the sensing apparatus may determine not only the input position of the touch object, but also an input pen pressure of the touch object, by using the corrected sensing signals.

According to the embodiments of the present invention, a sensing apparatus is capable of correcting an error caused by a difference between resistances or impedances of the sub-loops, and a control method thereof is provided. As a result of the correction process, signals which are output from the sub-loops can have the same form as when all the sub-loops all have an identical resistance value. Accordingly, embodiments of the present invention allow an input point of the touch object to be accurately detected. Also, the phase of an input signal of the touch object can be accurately corrected, so that it is possible to more accurately measure a pen pressure.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A sensing apparatus of an electromagnetic induction input type, which determines an input position of a touch object, the sensing apparatus comprising:
    a loop unit, comprising one or more sub-loops, which receives an input signal from the touch object and outputs one or more sensing signals;
    a resistance information measurement unit for measuring a resistance of each of the one or more sub-loops, and generating a resistance information lookup table with each resistance value of a corresponding sub-loop of the one or more sub-loops; and
    a controller for correcting the one or more sensing signals based on the resistance information lookup table, and determining the input position of the touch object based on peak points of the corrected one or more sensing signals,
    wherein the sensing apparatus alternatively switches between a first mode for measuring the input position of the touch object and a second mode for measuring the resistance of each of the one or more sub-loops to generate the resistance information lookup table,
    wherein the controller determines a pressure of the touch object based on the corrected one or more sensing signals, and
    wherein the controller determines a respective weight, by which each of the one or more sensing signals is required to be multiplied, based on the resistance information lookup table.

2. The sensing apparatus as claimed in claim 1, wherein the resistance information measurement unit comprises:
    a sensing resistance unit connected to an end of the one or more sub-loops; and
    a sensor unit for sensing a value of a voltage applied to the sensing resistance unit and a value of a current flowing through the sensing resistance unit.

3. The sensing apparatus as claimed in claim 2, wherein the resistance information measurement unit determines a sub-loop to be tested from the one or more sub-loops, applies a preset voltage to the sub-loop to be tested, and senses the value of the voltage applied to the sensing resistance unit and the value of the current flowing through the sensing resistance unit.

4. The sensing apparatus as claimed in claim 3, wherein the resistance information measurement unit determines a resistance value of the sub-loop to be tested, based on the preset voltage, the value of the voltage applied to the sensing resistance unit, and the value of the current flowing through the sensing resistance unit.

5. The sensing apparatus as claimed in claim 4, wherein the resistance information measurement unit determines the resistance value of the sub-loop to be tested for each of the one or more sub-loops.

6. The sensing apparatus as claimed in claim 2, further comprising a switching unit for selectively connecting the end of the one or more sub-loops to the controller or the resistance information measurement unit.

7. The sensing apparatus as claimed in claim 6, wherein the switching unit connects the end of the one or more sub-loops to the resistance information measurement unit in the second mode for measuring resistance information, and connects the end of the one or more sub-loops to the controller in the first mode for determining an input point of the touch object.

8. The sensing apparatus as claimed in claim 1, further comprising a resistance unit connected to the end of the one or more sub-loops, wherein the resistance information measurement unit includes a sensor unit for sensing a value of a voltage applied to the resistance unit and a value of a current flowing through the resistance unit.

9. The sensing apparatus as claimed in claim 1, further comprising a sensing signal processor for processing the one or more sensing signals, wherein the sensing signal processor amplifies the one or more sensing signals by a preset gain, filters the amplified one or more sensing signals, and performs Analog-to-Digital Conversion (ADC) on the one or more filtered sensing signals.

10. A control method of a sensing apparatus of an electromagnetic induction input type, which determines an input position of a touch object and includes one or more sub-loops, the control method comprising the steps of:
receiving an input signal from the touch object, and outputting one or more sensing signals;
measuring a resistance of each of the one or more sub-loops, and generating a resistance information lookup table with each resistance value of a corresponding sub-loop of the one or more sub-loops;
correcting the one or more sensing signals based on the resistance information lookup table; and
determining the input position of the touch object based on peak points of the corrected one or more sensing signals; and
determining a pressure of the touch object based on the corrected one or more sensing signals,
wherein the sensing apparatus alternatively switches between a first mode for measuring the input position of the touch object and a second mode for measuring the resistance of each of the one or more sub-loops to generate the resistance information lookup table, and
wherein correcting the one or more sensing signals comprises determining a respective weight, by which each of the one or more sensing signals is required to be multiplied, based on the resistance information lookup table.

11. The control method as claimed in claim 10, wherein the sensing apparatus further comprises a sensing resistance unit connected to an end of the one or more sub-loops, and further comprising sensing a value of a voltage applied to the sensing resistance unit and a value of a current flowing through the sensing resistance unit.

12. The control method as claimed in claim 11, wherein generating the resistance information lookup table comprises:
determining a sub-loop to be tested from the one or more sub-loops;
applying a preset voltage to the sub-loop to be tested; and
sensing the value of the voltage applied to the sensing resistance unit and the value of the current flowing through the sensing resistance unit.

13. The control method as claimed in claim 12, wherein generating the resistance information lookup table comprises determining a resistance value of the sub-loop to be tested, based on the preset voltage, the value of the voltage applied to the sensing resistance unit, and the value of the current flowing through the sensing resistance unit.

14. The control method as claimed in claim 13, wherein generating the resistance information lookup table comprises determining the resistance value of the sub-loop to be tested for each of the one or more sub-loops.

15. The control method as claimed in claim 10, wherein:
the sensing apparatus further comprises a resistance unit connected to the end of the one or more sub-loop, and
generating the resistance information lookup table comprises sensing a value of a voltage applied to the resistance unit and a value of a current flowing through the resistance unit.

16. The control method as claimed in claim 10, further comprising:
amplifying the one or more sensing signals by a preset gain;
filtering the amplified one or more sensing signals; and
performing Analog-to-Digital Conversion (ADC) on the one or more filtered sensing signals.

17. A sensing apparatus of an electromagnetic induction input type, which determines an input position of a touch object, the sensing apparatus comprising:
a loop unit, comprising one or more sub-loops, which receives an input signal from the touch object and outputs one or more sensing signals;
a storage unit for storing a resistance information lookup table with a respective resistance matched to each of the one or more sub-loops; and
a controller for correcting the one or more sensing signals based on peak points of the resistance information lookup table, and determining the input position of the touch object based on the corrected one or more sensing signals,
wherein the sensing apparatus alternatively switches between a first mode for measuring the input position of the touch object and a second mode for measuring the resistance of each of the one or more sub-loops to generate the resistance information lookup table,
wherein the controller determines a pressure of the touch object based on the corrected one or more sensing signals, and wherein the controller determines a respective weight, by which each of the one or more sensing signals is required to be multiplied, based on the resistance information lookup table.

18. A control method of a sensing apparatus of an electromagnetic induction input type, which determines an input position of a touch object, the control method comprising the steps of:
receiving an input signal from the touch object, and outputting one or more sensing signals from one or more sub-loops;
reading a previously-stored resistance information lookup table with a respective resistance matched to each of the one or more sub-loops;
correcting the one or more sensing signals based on peak points of the resistance information lookup table, and determining the input position of the touch object based on the corrected one or more sensing signals; and
determining a pressure of the touch object based on the corrected one or more sensing signals,
wherein the sensing apparatus alternatively switches between a first mode for measuring the input position of the touch object and a second mode for measuring the resistance of each of the one or more sub-loops to generate the resistance information lookup table, and
wherein correcting the one or more sensing signals comprises determining a respective weight, by which each of the one or more sensing signals is required to be multiplied, based on the resistance information lookup table.

* * * * *